United States Patent

Perkins

[15] 3,696,425
[45] Oct. 3, 1972

[54] NAVIGATION SYSTEM FOR IMPROVING NOISY SIGNALS

[72] Inventor: Earl Stuart Perkins, Oak Brook, Ill.

[73] Assignee: Butler National Corporation, Oak Brook, Ill.

[22] Filed: April 30, 1970

[21] Appl. No.: 33,232

[52] U.S. Cl. ..................................343/107, 325/478
[51] Int. Cl. ...............................................G01s 1/08
[58] Field of Search ....343/102, 106, 107, 7 A, 18 E; 325/478, 480, 323; 324/111, 83

[56] References Cited

UNITED STATES PATENTS 3,543,165    11/1970    Tomsa....................325/478 X
2,802,939    8/1957    Klehfoth.................325/478 X Primary Examiner—Carl D. Quarforth
Assistant Examiner—J. M. Potenza
Attorney—Hill, Sherman, Meroni, Gross & Simpson

[57] ABSTRACT

A navigation system which includes monitoring means for continuously monitoring the navigation signal such that if an intelligent signal varies at an inordinately high rate the rapidly fluctuating signals are not fed to the output of the system but the output continues to indicate the prior output until such time that the inordinately rapid rate signals disappear.

5 Claims, 2 Drawing Figures

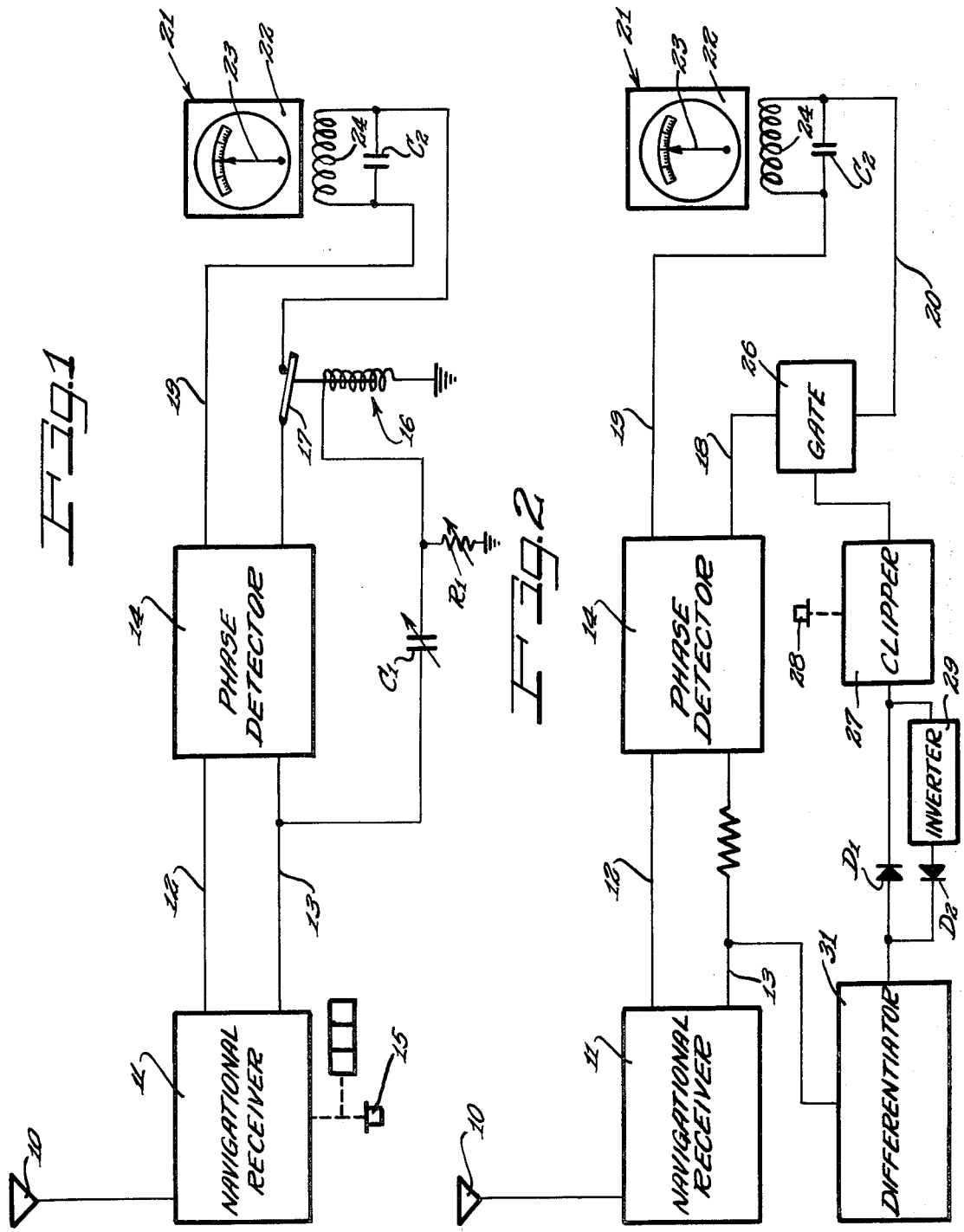

NAVIGATION SYSTEM FOR IMPROVING NOISY SIGNALS

BACKGROUND OF THE INVENTION

1. Field of the Invention

This invention relates in general to navigation systems and in particular to aircraft navigation systems.

2. Description of the Prior Art

VOR navigation systems have been used for many years to indicate an aircraft's position relative to a selected radial from a ground station. At times the outputs from such systems are subject to rapid fluctuations which are greater than what could be possible with the physical constraints of the system. However, prior VOR systems have indicated such erratic outputs and have resulted in confusion and ambiguous indications to the pilot.

SUMMARY OF THE INVENTION

The present invention comprises a monitoring and disabling system wherein the output of a navigation receiver is continuously monitored and when the signal varies at a rate greater than that possible under the conditions which actually exist, the output of the receiver is disconnected from the indicator and the indicator remembers and continues to indicate the last information based on good information from the receiver until the output again changes to a condition which does not vary at an unacceptable rate.

Other objects, features and advantages of the invention will be readily apparent from the following description of certain preferred embodiments thereof taken in conjunction with the accompanying drawings, although variations and modifications may be effected without department from the spirit and scope of the novel concepts of the disclosure, and in which:

BRIEF DESCRIPTION OF THE DRAWINGS

FIG. 1 is a block diagram of the navigation system of this invention; and

FIG. 2 is a block diagram of a modification of the invention.

DESCRIPTION OF THE PREFERRED EMBODIMENTS

FIG. 1 illustrates a navigation system according to this invention including an antenna 10 which is connected to a navigational receiver 11 which might be, for example, a VOR receiver. A radial selector knob and indicator 15 is connected to the navigation receiver and allows the selection of a particular radial of the VOR transmitter. The navigation receiver 11 includes conventional detectors for the reference and variable phase signals. The reference 30 cycle signal, for example, appears on lead 12 and is supplied to a phase detector 14 and the variable signal is applied to lead 13 which is connected to the phase detector 14. The phase detector 14 compares the phase of the signals on leads 12 and 13 and produces outputs on leads 18 and 19 which indicate the phase relationship between the variable and reference signals which indicate the aircraft's position. A switch 17 is connected in lead 18. A left-right indicator 21 has a needle 23 which indicates the position of the aircraft relative to the selected radial. A meter movement 24 is connected to leads 18 and 19 and a capacitor C2 is connected across the meter movement 24.

A differentiating circuit comprising a variable capacitor C1 and a variable resistor R1 receives a variable phase signal from lead 13. One side of resistor R1 is connected to ground. A relay 16 has its energizing coil connected to the resistor R1 and the other side connected to ground. The switch 17 is controlled by the armature of the relay 16.

In operation, a selected radial is selected by knob 15 and the output across leads 18 and 19 indicate the position of the aircraft relative to the selected radial. Thus the needle 23 moves to the left or right as the aircraft's position varies relative to the selected radial. As long as the rate of change of the variable frequency signal on lead 13 is less than the threshold energizing value for relay 16, the switch 17 will stay closed, and the output of the phase detector will be supplied through leads 18 and 19 to the meter movement 24.

However, when the rate of change of the variable signal is greater than the threshold value required to energize relay 16, the relay will be energized and switch 17 will be opened and the output of the phase detector 14 will be disconnected from the meter 21. It is to be realized that very rapid rates of change of the variable signal from the VOR receiver normally indicates that there are errors in the received signal since the maximum rate of change of the variable signal due to a position change of the aircraft can be determined by the aircraft's distance from the station, its air speed and its course. Thus if the rate of change of the variable signal is higher than is possible for particular conditions, the relay 16 will be energized opening switch 17 thus removing the erroneous signal from the meter movement 24 so that the needle 23 does not follow a signal which is an error. During the time switch 17 is open, the capacitor C2 will tend to hold the needle 23 in the position it had before switch 17 opened. As soon as the spurious signal disappears from the lead 13 the output of the differentiating circuit will reduce to a value such that the relay 16 will be deenergized and switch 17 will close and allow the output of the phase detector to be supplied through leads 18 and 19 to the meter movement 24.

Thus, it is seen that this invention provides means for disconnecting signals which vary at a rate higher than a preestablished rate and allows the erroneous fluctuations to be ignored by the indicator. As soon as the signal becomes stable, it is again connected to the indicator. Thus the indicator provides more accurate information to the observor and does not follow spurious excursions of the variable signal.

FIG. 2 illustrates a modification of the invention wherein the variable reference signal on lead 13 is supplied to a differentiator 31 which supplies an output to a pair of diodes D1 and D2. The anode of diode D1 is connected to the differentiator 31 and the cathode of diode D2 is connected to the differentiator 31. The diode D1 passes positive going signals and the diode D2 passes negative going signals. Since the output of the differentiator 31 will be positive when the rate of the variable signal is increasing and negative when it is decreasing, the diodes D1 and D2 allow both the negative and positive signals to pass. The inverter 29 is connected to the diode D2 to invert a negative signal to a positive one and its output is connected to the cathode of the diode D1. A clipper 27 has a clipping level adjustment knob 28 to set the clipping level and receives the outputs of the inverter 29 and diode D1 and supplies an input to a gate 26 which is connected in lead 18 between the phase detector 14 and the meter movement 24. When the rate detected by the differentiator 31 in the variable signal on lead 13 is such that the peak amplitudes of the differentiated signal passes the clipper 27, the gate 26 will be opened and the signal from the phase detector will be disconnected from the meter movement 24 by the open gate 26. Since the knob 28 allows the clipping level of the clipper 27 to be adjusted, the rate of change of the variable signal 13 which opens the gate 26 may be adjusted by adjusting the position of the knob 28 and the level of clipper 27.

The system of FIG. 2 operates as the system of FIG. 1 except that the gate 26 may be an electronic gate and the response may be much faster than the electromechanical relay of FIG. 1. Also, since the output of the clipper 27 may be adjusted by the knob 28 the cut-off level of the gate 26 may be adjusted as desired.

It is seen that this invention provides means and circuits for preventing extremely high rates of change of the variable signal from energizing and causing erroneous indications on an indicator. Although the invention has been described with respect to the preferred embodiments it is not to be so limited as changes and modifications may be made therein which are within the full intent and scope as defined by the appended claims.

I claim:
1. A navigation system including:
a navigation receiver producing a reference output signal and a variable output signal;
a phase detector receiving the reference and variable output signals;
indicator means receiving the output of said phase detector;
a gating means connected between said phase detector and said indicator means;
a differentiating means receiving an output from said navigation receiver and connected to said gating means to energize it when the rate of change of the output of said navigation receiver exceeds a preset threshold; and
a first capacitor connected in parallel with said indicator means.

2. A navigation system including:
a navigation receiver producing a reference output signal and a variable output signal;
a phase detector receiving the reference and variable output signals;
indicator means receiving the output of said phase detector;
a gating means connected between said phase detector and said indicator means;
a differentiating means receiving an output from said navigation receiver and connected to said gating means to energize it when the rate of change of the output of said navigation receiver exceeds at preset threshold; and
a pair of diodes connected to the output of said differentiating means and poled to pass signals of opposite polarity, an inverter connected to one of said pair of diodes, a clipper connected to the output of said inverter and to the other of said pair of diodes, and the output of said clipper connected to said gating means.

3. A navigation system according to claim 2 including means for varying the clipping level of said clipper.

4. A navigation system including:
a navigation receiver producing a reference output signal and a variable output signal;
a phase detector receiving the reference and variable output signals;
indicator means receiving the output of said phase detector;
a gating means connected between said phase detector and said indicator means, and comprising a relay and a switch with said switch connected between said phase detector and said indicator means and said relay connected to output across said resistor;
a differentiating means receiving an output from said navigation receiver and connected to said gating means to energize it when the rate of change of the output of said navigation receiver exceeds a preset threshold, and comprising a first capacitor and a resistor; and
a second capacitor connected in parallel with said indicator means.

5. A navigation system including:
a navigation receiver producing a reference output signal and a variable output signal;
a phase detector receiving said reference and variable output signals;
indicator means receiving the output of said phase detector;
a gating means connected between said phase detector and said indicator means; and
a differentiating means comprising a first capacitor and a resistor receiving said variable output signal from said navigation receiver and connected to said gating means to energize it when the rate of change of said variable output signal of said navigation receiver exceeds a preset threshold, a second capacitor connected in parallel with said indicator means and wherein said gating means comprises a relay and a switch with said switch connected between said phase detector and said indicator means and said relay connected to the output across said resistor.

* * * * *